Jan. 1, 1935.  J. OAKLEY  1,986,598
SPROCKET
Filed Feb. 27, 1934
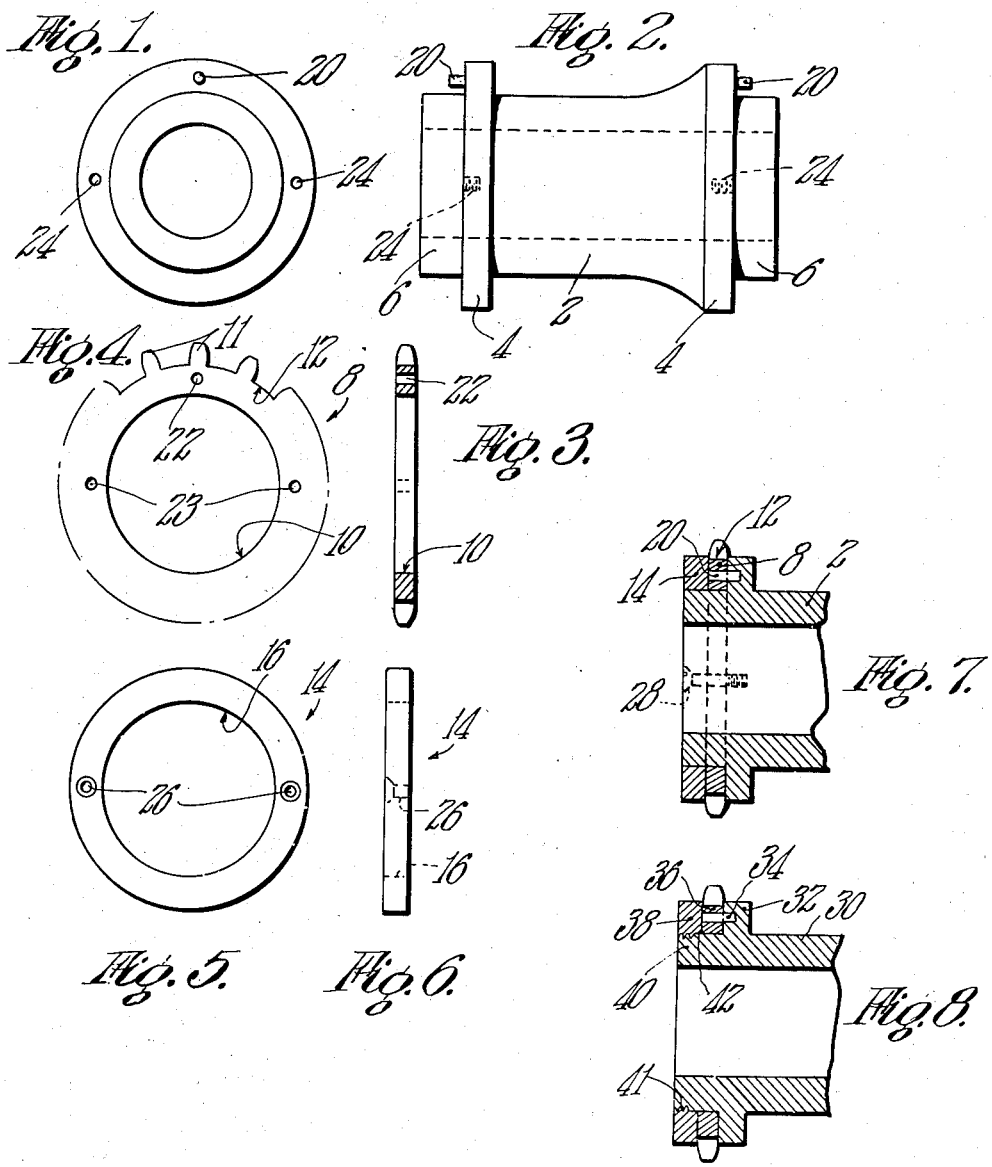
INVENTOR.
John Oakley.
BY
ATTORNEY.

Patented Jan. 1, 1935

1,986,598

UNITED STATES PATENT OFFICE 1,986,598

SPROCKET

John Oakley, Springfield, Mass., assignor to Perkins Machine and Gear Company, West Springfield, Mass., a corporation of Massachusetts Application February 27, 1934, Serial No. 713,149

2 Claims. (Cl. 74—243)

This invention relates to improvements in sprockets and is directed more particularly to improvements in sprockets having sets of teeth at opposite ends thereof so as to be adapted for use in feeding and guiding films for motion picture apparatus.

According to this invention, a sprocket assembly is provided wherein rows of teeth are arranged at opposite ends of the sprocket assembly so that the teeth of the rows are arranged in sets or pairs. In order that the root diameters of the sprocket portions may be below the diameter of the barrel portions adjacent thereto, the sprocket members of the assembly are made as separate parts, and then, when the parts are assembled the roots of the sprocket members are disposed below the barrels. In this way the structure may be produced economically and make it possible to reverse or replace a sprocket member at will.

Various novel features of construction and advantages of the invention will be more fully hereinafter referred to in connection with the accompanying description of the preferred form of the invention which for purposes of disclosure is shown in the accompanying drawing, wherein:

Figs. 1 and 2 are end and side elevational views of the body of the sprocket structure.

Figs. 3 and 4 are sectional elevational and side elevational views respectively of one of the sprocket members.

Figs. 5 and 6 are front and side elevational views respectively of one of the collar members.

Fig. 7 is a partial sectional elevational view at one end of the sprocket assembly, and Fig. 8 is a view similar to Fig. 7 showing a modified form of the invention.

Referring now to the drawing more in detail, the invention will be fully described.

In the manufacture of sprockets of the type to which this invention relates, the teeth are usually formed by moving a rotating cutter towards and away from the axis of the sprocket. This, however, tends to cause the working faces of the teeth to be convexed so that corners are presented which tend to injure the holes in the moving picture film, while the face of the teeth are inclined to show tool marks. The teeth are necessarily small to work in small holes in the film and must not only be accurately formed for precision in operation but must be free of defects which tend to mar the film.

According to this invention sprocket members are formed as separate units wherefore it is possible to provide the utmost accuracy in the formation of the teeth thereof and these are assembled with other parts as will appear.

A sprocket body is shown in Figs. 1 and 2 which has drum or barrel portions 4 at opposite ends thereof on the outer side of which are hubs 6. The outer faces of the hubs or drum portions or the overall distance between the outer faces of the drum portions are such as will space the sprocket members at the proper and desired distance apart.

A pair of sprocket members, such as indicated in Figs. 3 and 4, one for each end of the sprocket structure, are bored at 10 so that they may be slipped over the hubs 6. To facilitate economy in manufacture a plurality of discs in stacked relation have the teeth 11 formed therein by passing a suitable cutter longitudinally of the stack. This not only makes it possible to form the teeth on a plurality of sprocket members simultaneously but the action of the cutter in such a case is such as will produce teeth having flat and very smooth working faces and edges free from burrs which is desirable in teeth of sprockets of this character.

The teeth are cut proportionally deeper than would be the case with standard teeth of the same size or pitch so that when the sprocket members are assembled on the hubs 6, the roots of the sprocket members indicated by 12 will be at some distance below the peripheries of the barrel portions 4.

A pair of collars, one of which is shown in Figs. 5 and 6, is provided. These consist of a ring-like disc 14 which is bored at 16 to receive the hub 6 and preferably its outer diameter corresponds to the outer diameter of the barrel portion 4.

In order that the sprocket members 8 will not turn on the hubs 6 and also to insure aligning of the teeth of the sprocket members at either ends of the body, one or more dowels 20 are provided on the outer face of each of the drum portions. The sprocket members 8 are provided with openings 22 to receive the dowels. Also the sprockets are provided with holes 23 to receive screws as will appear.

With the openings 22 provided in the sprocket members in a certain relation with respect to one or, in fact, all of the teeth, it is possible to assemble the sprocket members on the hub so that the teeth of one sprocket member are in exact alignment with the teeth of the other.

The collars are secured to the hub in any suitable manner. For instance, the ends of the hubs are provided with one or more tapped holes 24 and the collars are provided with openings 26 to register therewith so that screws may be screwed through the sprockets into holes 24.

With the sprocket members 8 formed in some suitable manner such as described they are slipped onto the hubs with the openings 22 thereof receiving the dowels 20. Then the collars 14 are slipped over the hubs against the sprocket members. Screws 28 extend through the collars and sprocket members and are screwed into holes 24 to draw the parts together so that the sprocket members are suitably held against the drum portions of the body.

In this way, there is provided a unitary structure formed by the several separate parts. It will be noticed as one feature of the invention that the root diameters of the sprocket members are below the surface of the drum or barrel portion. This is so that the teeth of the sprocket members are free for their action in the opening of the moving picture film. The film rests on the barrel portion with the sprocket teeth extending into and through the openings thereof and is at a considerable distance above the root diameters of the sprocket members whereby foreign matter between the teeth will not tend to elevate the film from the surface of the barrel portion.

In the modified form of the invention shown in Fig. 8, there is provided a body member 30 which has drum or barrel portions 32 at its opposite ends similar to the barrel portions 4 of Figs. 2 and 7.

A dowel 34 is associated with each of the barrel portions which is receivable in suitable openings in sprocket members 36 which may be like sprocket members 8. Collars 38 in this case are internally screw threaded to receive screw threads 41 on the extreme end portions of hubs 40 which correspond to the hubs 6 in the form of the invention shown in Fig. 2.

It is desired that there be screw threads for a short distance inwardly from the ends of the hubs so as to provide smooth hub portions 42 and smooth bores in the collars. This is so that the collars will have a suitable bearing on the ends of the hubs and thereby the collars will be disposed concentrically of the barrel portions.

Having described the invention in the form at present preferred what I desire to claim and secure by Letters Patent of the United States is:

1. A sprocket assembly for a film having apertures along its opposite sides comprising in combination, a body having cylindrical barrel portions at opposite ends thereof of a certain diameter and hubs extending outwardly from said barrel portions of less diameter than that of said barrel portions forming end faces at the ends of said barrel portions, toothed sprocket members having bores receiving said hubs and abutting the said end faces, clamp collars on said hubs abutting the outer sides of said sprocket members of a diameter substantially equal to that of the barrel portions, the said sprocket members and collars being provided with apertures, pins extending from said barrel portions receivable in certain of said apertures of the sprocket members, and screws passing through the apertures in said collars and certain apertures of said sprocket members threadedly engaging said barrel portions, the teeth of said sprocket members being formed to provide root diameters for the sprocket members in the spaces between said teeth which are less than said certain diameter to form depressions between adjacent faces of adjacent teeth and adjacent edges of adjacent barrel portions and collars, co-extensive with the sides of said teeth, all adapted and arranged whereby an apertured film receiving the teeth of the sprocket members and contacting said barrel portions is out of contact with and spaced from the sprocket members over said depressions but is supported by said barrel portions and collars immediately adjacent the sides of said teeth.

2. A sprocket for a film having apertures along the opposite sides comprising in combination, a body having cylindrical barrel portions at opposite ends thereof of a certain diameter, hubs extending outwardly from said barrel portions which are of less diameter than that of said barrel portions providing end faces at the ends of said barrel, toothed sprocket members having bores receiving said hubs abutting said end faces, clamp collars on said hubs against said sprocket members, and means causing the collars to clamp the sprocket members to the end faces of the barrel portions, the said sprocket members having the teeth thereof formed to provide root diameters in the spaces between the teeth less than said certain diameter of the barrel portions whereby an apertured film bearing on the barrel portions with its apertures receiving the teeth of the sprocket members will be spaced above said root diameter of the sprocket members.

JOHN OAKLEY.